United States Patent
Liu et al.

(10) Patent No.: US 11,720,623 B2
(45) Date of Patent: Aug. 8, 2023

(54) SYSTEMS AND METHODS FOR AUTOMATICALLY ANNOTATING IMAGES

(71) Applicant: Walmart Apollo, LLC, Bentonville, AR (US)

(72) Inventors: Haining Liu, Dallas, TX (US); Feiyun Zhu, Arlington, TX (US); Ryan B. Reagan, Fort Worth, TX (US); Zhichun Xiao, Plano, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 438 days.

(21) Appl. No.: 17/097,601

(22) Filed: Nov. 13, 2020

(65) Prior Publication Data

US 2021/0150276 A1 May 20, 2021

Related U.S. Application Data

(60) Provisional application No. 62/935,378, filed on Nov. 14, 2019.

(51) Int. Cl.
*G06K 9/00* (2022.01)
*G06K 9/52* (2006.01)
(Continued)

(52) U.S. Cl.
CPC .......... *G06F 16/55* (2019.01); *G06F 18/2148* (2023.01); *G06N 20/00* (2019.01);
(Continued)

(58) Field of Classification Search
None
See application file for complete search history.

(56) References Cited

U.S. PATENT DOCUMENTS 8,267,316 B2 * 9/2012 Ostrowski ............... A47F 9/045
235/383
10,339,595 B2 * 7/2019 Glaser ..................... G06V 20/52
(Continued)

OTHER PUBLICATIONS

Li, Congcong, et al. "Data priming network for automatic checkout." Proceedings of the 27th ACM international conference on multimedia. 2019. (Year: 2019).*
(Continued)

*Primary Examiner* — Avinash Yentrapati
(74) *Attorney, Agent, or Firm* — Fitch, Even, Tabin & Flannery LLP (57) ABSTRACT

In some embodiments, apparatuses and methods are provided herein useful to automatically annotating images. In some embodiments, a system for automatically annotating images comprises a database, wherein the database is configured to store images and annotations for the images and a control circuit, wherein the control circuit is communicatively coupled to the database, and wherein the control circuit is configured to retrieve, from the database, an image, generate, based on the image, a collection of augmented images, generate segmentation maps for each image in the collection of augmented images, wherein each of the segmentation maps include segments, select, based on a threshold, ones of the segments above a threshold, merge the ones of the segments above the threshold to create a segmented image, and generate, for each segment of the segmented image, classifications, wherein an annotation for the image includes the segmented images and the classifications.

20 Claims, 4 Drawing Sheets

(51) Int. Cl.
  *G06F 16/55* (2019.01)
  *G06T 7/136* (2017.01)
  *G06N 20/00* (2019.01)
  *G06T 3/00* (2006.01)
  *G06F 18/214* (2023.01)
  *G06V 10/764* (2022.01)
  *G06V 10/774* (2022.01)
  *G06V 10/26* (2022.01)
  *G06V 10/24* (2022.01)

(52) U.S. Cl.
  CPC ............ *G06T 3/0056* (2013.01); *G06T 7/136* (2017.01); *G06V 10/26* (2022.01); *G06V 10/764* (2022.01); *G06V 10/774* (2022.01); *G06V 10/247* (2022.01)

(56) References Cited

U.S. PATENT DOCUMENTS

| | | | |
|---|---|---|---|
| 2014/0002646 A1* | 1/2014 | Scheffer | G06Q 30/06 348/143 |
| 2016/0300212 A1* | 10/2016 | Cordova | G07G 3/003 |
| 2021/0142105 A1* | 5/2021 | Siskind | G06N 20/00 |

OTHER PUBLICATIONS

Wei, X. S., et al. "RPC: A large-scale retail product checkout dataset. arXiv 2019." arXiv preprint arXiv:1901.07249. (Year: 2019).*

Li, Congcong, et al.; "Data Priming Network for Automatic Check-Out"; Proceedings of the 27th ACM International Conference on Multimedia; Oct. 2019; pp. 2152-2160.

* cited by examiner

SYSTEMS AND METHODS FOR
AUTOMATICALLY ANNOTATING IMAGES

CROSS-REFERENCE TO RELATED APPLICATION

This application claims the benefit of U.S. Provisional Application No. 62/935,378, filed Nov. 14, 2019, which is incorporated by reference in its entirety herein.

TECHNICAL FIELD

This invention relates generally to machine learning and, more particularly, to machine learning models for images.

BACKGROUND

As technology advances, machine learning is becoming increasingly common. Often, machine learning is used to analyze data that would otherwise be analyzed by a human user. For example, machine learning can be used to identify objects in images. However, while machine learning can be used to decrease human involvement, machine learning models are typically trained using data analyzed by human users. This human analysis of data to train the machine learning models can be quite expensive and time consuming, slowing the progress of machine learning models. Accordingly, a need exists for systems, methods, and apparatuses that further remove, or minimize, the need for human involvement in training learning models.

BRIEF DESCRIPTION OF THE DRAWINGS

Disclosed herein are embodiments of systems, apparatuses, and methods pertaining automatically annotating images. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to automatically annotating images. In some embodiments, a system for automatically annotating images comprises a database, wherein the database is configured to store images and annotations for the images and a control circuit, wherein the control circuit is communicatively coupled to the database, and wherein the control circuit is configured to retrieve, from the database, an image, generate, based on the image, a collection of augmented images, generate segmentation maps for each image in the collection of augmented images, wherein each of the segmentation maps include segments, select, based on a threshold, ones of the segments above a threshold, merge the ones of the segments above the threshold to create a segmented image, and generate, for each segment of the segmented image, classifications, wherein an annotation for the image includes the segmented images and the classifications.

As previously discussed, machine learning algorithms can be used to analyze information that human users would typically analyze. As one example, machine learning can be used to recognize items in images. However, in order to recognize items in images, the machine learning models must be trained. Machine learning models are typically trained using test data sets that have been annotated by human users. For example, in an image recognition system, human users annotate a large number of images. The annotations indicate the type of item in the image, a segmentation of the image, etc. The machine learning model is then trained using the human-annotated images. Unfortunately using human users to annotate images is expensive and time consuming. In fact, human annotation can be so expensive and/or time consuming that it prevents the expansion of machine learning into new fields or inhibits groups from employing machine learning. Described herein are systems, methods, and apparatuses that seek to minimize, if not eliminate, the need for human users to annotate images.

In one embodiment, a system automatically annotates images. The automatically annotated images are used to train a learning model. In an effort to increase the number of images, and confidence with which a machine learning model can identify items in an image, the system annotates a collection of augmented images. The system generates the augmented images based on a base image. For example, the system can rotate, distort, recolor, crop, etc. the base image to generate an augmented image. The system generates segmentation maps for each of the augmented images. The system compares the segmentation maps for consistency and generates a segmented image. The system then classifies each of the segments in the segmented image. The annotations for the image include both the segmented image and the classifications for the segments. It should be noted that initially, in some embodiments, the system can use synthesized annotated images or existing small scale image sets to train a low capacity model. In such embodiments, the system can use this low capacity model to generate and/or merge the segmentation maps. The discussion of FIGS. 1A-1C provide background information regarding such a system.

Figure 1A:
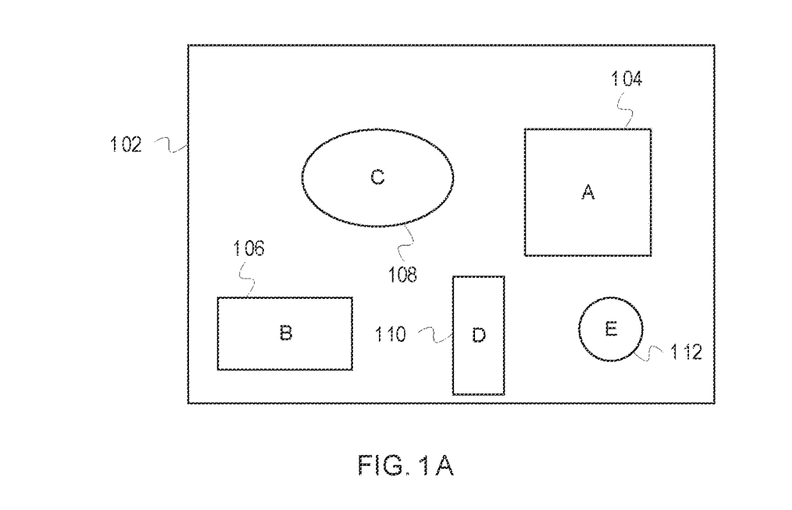
FIGS. 1A-1C depict an image 102 during various stages of an annotation process, according to some embodiments.
Figure 1B:
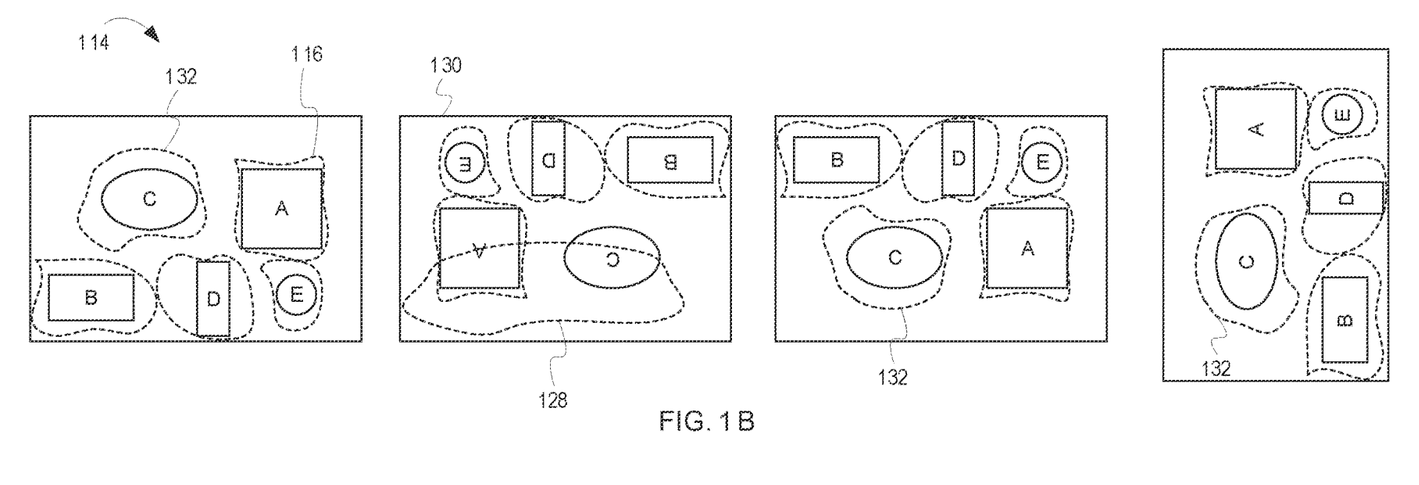
Figure 1C:
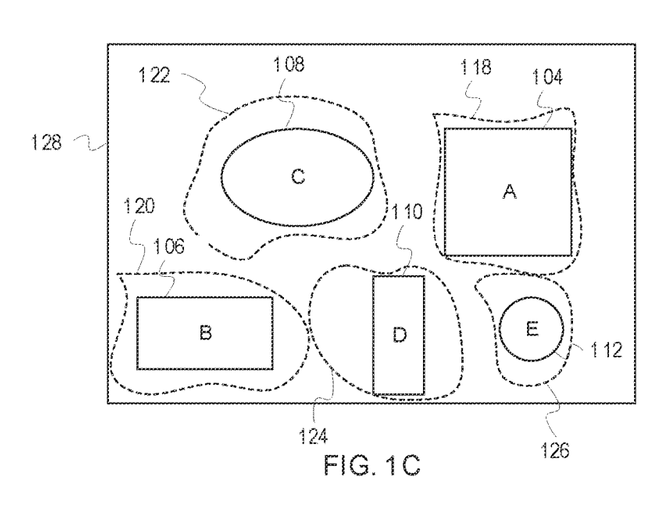

FIGS. 1A-1C depict an image 102 during various stages of an annotation process, according to some embodiments. FIG. 1A depicts the image 102 (i.e., an "original" or "base" image) upon which augmented images 114 (depicted in FIG. 1B) are based. The image 102 can be an image (e.g., photograph, video frame, document, computer-generated image, etc.) of anything. However, for ease of example, the discussion will refer to the image 102 as an image of products (e.g., products for sale at a retail facility). The image 102 includes five products: Product A 104, Product B 106, Product C 108, Product D 110, and Product E 112. In one embodiment, the image 102 is of a cart and the products are located in the cart.

To a certain extent, the accuracy with which a machine learning model can perform a task, in this example recognize products in images, is based on the data set with which the learning model is trained. The richer the data set, the more accurate the machine learning model. To this end, it is often a goal to use a large data set that is well annotated. The systems, methods, and apparatuses described herein seek to achieve this goal by augmenting the images used for the data set. That is, the image 102 is augmented to create the augmented images 114 (i.e., images that are based on the image 102). The system creates the augmented images by altering qualities, properties, aspects, etc. of the image 102. For example, the system can generate the augmented images 114 by adjusting the color of the image 102 (e.g., making the image 102 grayscale, enhancing the colors, inverting the colors, changing the colors, etc.), adjusting noise of the image 102, adjusting sharpness of the image 102, rotating the image 102 (e.g., about an axis, mirroring, etc.), cropping the image 102, resizing the image 102 (e.g., making the image 102 larger or smaller), etc. As depicted in FIG. 1B, the augmented images 114 are instances of the image 102 rotated to different orientations.

The augmented images 114 depicted in FIG. 1B include segments 116. That is, the augmented images 114 are segmentation maps. In some embodiments, the system generates segmentation maps for each of the augmented images 114. The multiple segmentation maps are used to generate a segmented image 128, depicted in FIG. 1C. The segmented image 128 is a merger of all, or some, of the segmentation maps. For example, the system can merge all of the segmentation maps together to average or normalize the segmentation of each of the augmented images 114. In some embodiments, the system may only merge a portion of the segmentation maps. For example, the system may "discard" or otherwise not include segmentation maps that are inconsistent with others of the segmentation maps. For example, if the system generates ten augmented images, eight of the segmentation maps include similar segments 116, and the remaining two segmentation maps include segments that do not correspond to those of the eight consistent segmentation maps, the system can generate the segmented image 128 based on the eight consistent segmentation maps. As an example, depicted in FIG. 1B, the differing segment 128 in the second segmentation map 130 differs from the corresponding segment 132 associated with Product C 108 in the other three other segmentation maps. If the differing segment 128 differs significantly enough, the differing segment 128, and possibly the second segmentation map 130, can be excluded from the merger of segmentation maps upon which the segmented image 128 is based.

In the segmented image 128, a segment is assigned to each of the five products: a first segment 118 is assigned to Product A 104, a second segment 120 is assigned to Product B 104, a third segment 122 is assigned to Product C 108, a fourth segment 124 is assigned to Product D 110, and a fifth segment 126 is assigned to Product E 112. The five segments are based on a merging of the segmentation of the augmented images 114. In some embodiments, merging the segmentation maps increases the accuracy with which the segments of the segmented image 128 can be formed.

Once the segmented image 128 is created, each of the five segments are classified. For example, in the case of an image including products, the classifications can indicate what product is associated with the segment, a type of product associated with the segment, a category of product associated with the segment, a color of a product associated with a segment, a product identifier of a product associated with the segment, etc. The system can generate the classification based on any suitable technique (e.g., computer-vision, object recognition, etc.). The segmented image 128 and the classifications are the annotations for the image 102. Once the image is annotated, it can be used to train the learning model.

Figure 2:
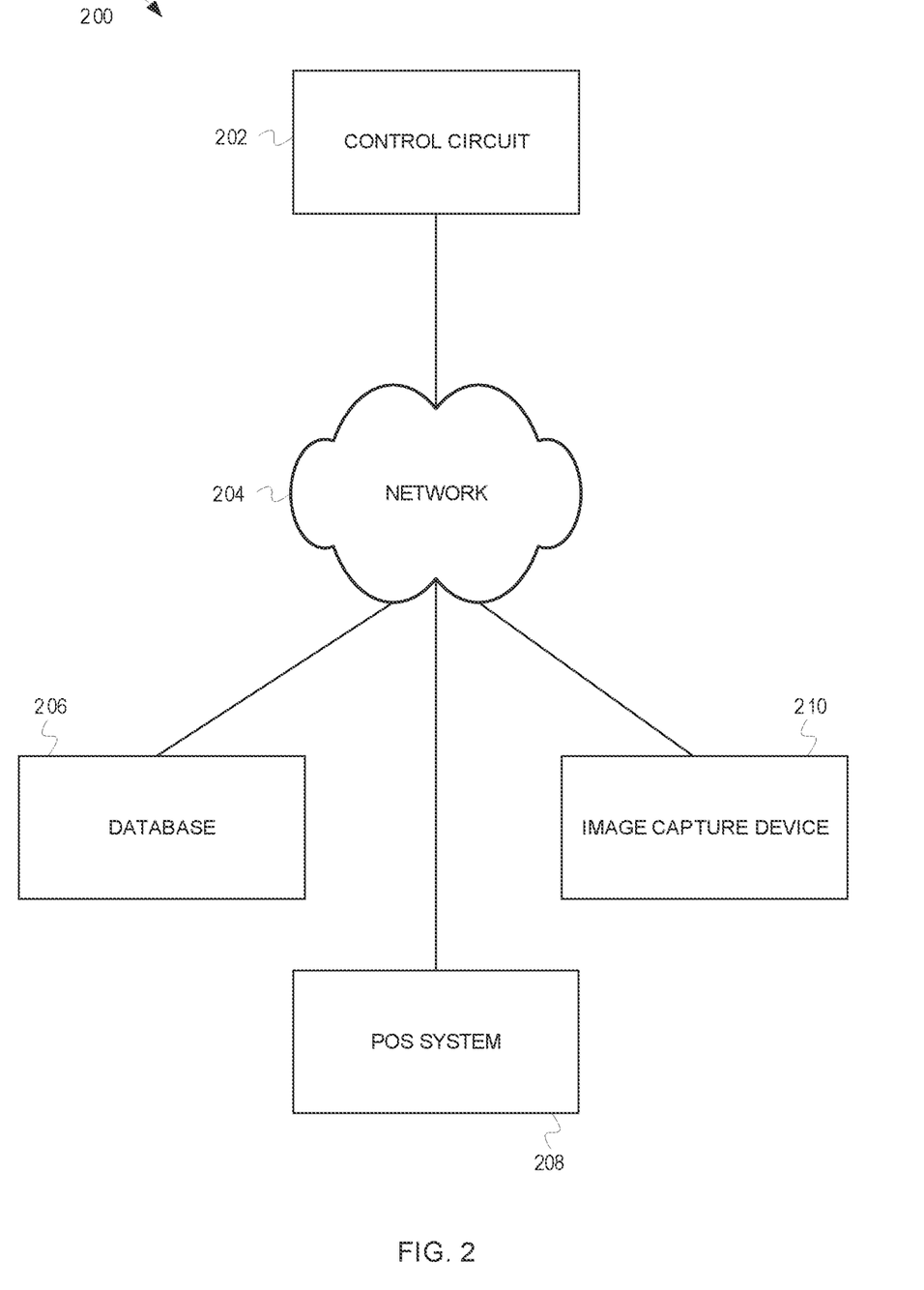
FIG. 2 is a block diagram of a system 200 for automatically annotating images, according to some embodiments.

While the discussion of FIGS. 1A-1C provides an overview of automatically annotating images, the discussion of FIG. 2 provides additional detail regarding a system for automatically annotating images.

FIG. 2 is a block diagram of a system 200 for automatically annotating images, according to some embodiments. The system 200 includes a control circuit 202, a database 206, a point-of-sale (POS) system 208, and an image capture device 210. One or more of the control circuit 202, database 206, POS system 208, and image capture device 210 are communicatively coupled via a network 204. The network 204 can be a local area network (LAN) and/or wide area network (WAN), such as the Internet, and include wired and/or wireless links.

The database 206 is configured to store images and annotations for the images. Accordingly, the database can be of any suitable type. The images are used to train a machine learning model for image recognition. Additionally, in some embodiments, the images can be used for product recognition in subsequent images. The annotations for the images can include one or more of classifications for the images, segments for the images, segmentation maps based on the images, etc.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

Generally, the control circuit 202 annotates the images. That is, the control circuit 202 creates segments for the images and classifies the segments. The annotations are used to train a learning model. To annotate images, the control circuit 202 retrieves an image from the database 206. The control circuit 202 augments the image, creating multiple images based on the image. For example, the control circuit 202 can augment the image (i.e., generate augmented images) by adjusting the color of the image (e.g., making the image grayscale, enhancing the colors, inverting the colors, changing the colors, etc.), adjusting noise of the image, adjusting sharpness of the image, rotating the image (e.g., about an axis, mirroring, etc.), cropping the image, resizing the image (e.g., making the image larger or smaller), etc. The augmented images allow the control circuit 202 to generate segmentation maps for multiple images that can be compared to one another. For example, because the augmented images are based on the same image, the augmented images should have at least some of the segments of their segmentation maps in common.

After segmenting the images, the control circuit 202 merges the segmentation maps to form a segmented image. In this manner, the segmented image is a composite of all of the previously generated segmentation maps. In some embodiments, the control circuit 202 uses all of the segmentation maps (e.g., the segmentation maps based on all of the augmented images) to generate the segmentation map. In other embodiments, the control circuit 202 does not use all of the segmentation maps when generating the segmented image. For example, in one embodiment, the control circuit 202 can discard or otherwise not include segmentation maps that fall below a threshold. That is, the control circuit 202 will only include those segmentation maps that are above a threshold. As one example, the threshold can be a consistency threshold. That is, the threshold can be an indicator of how consistent the segments of the segmentation maps are compared to others of the segmentation maps. For example, the consistency can be based on the number of the segments, the locations of the pixels included in each segment, the dimensions of the segments, etc. In some embodiments, the consistency threshold can be user defined and/or adjustable. As one example, the consistency threshold can be 70%, though any other desired thresholds (e.g., between 0% and 100%) are possible. Additionally, the threshold need not be based on a percentage, and could be based on any suitable metric whether quantitative or qualitative.

In some embodiments, after the learning process is complete (or possibly while the learning process is occurring), the control circuit 202 can be used to identify items in images. Though the control circuit 202 can be used to identify any type of items in any type of images, in a retail environment, the control circuit 202 can be used to identify products located in carts. In such embodiments, the image capture device 210 captures the images. The images include products (e.g., products located in a cart, products located on a product display unit, products in a delivery vehicle, etc.). In one embodiment, the image capture device 210 is located near the POS terminal (e.g., a full service or self-service POS terminal). The image capture device 210 captures images of customers' carts at the POS terminal. The control circuit 202, based on the images (in the database 206) and the annotations for the images, identifies the products in the customer's cart. This identification can be useful to verify that the correct products were scanned at the POS terminal, products weren't missed, product weren't double-scanned, etc. Further, in some embodiments, to aid in the identification process and, possibly the training of the machine learning model, the POS terminal can transmit transaction histories to the control circuit 202 to aid in identifying the products. In such embodiments, the control circuit 202 can compile a listed of products associated with a cart and use the list of products to better, more efficiently, and/or more quickly identify the products in the customer's cart.

Figure 3:
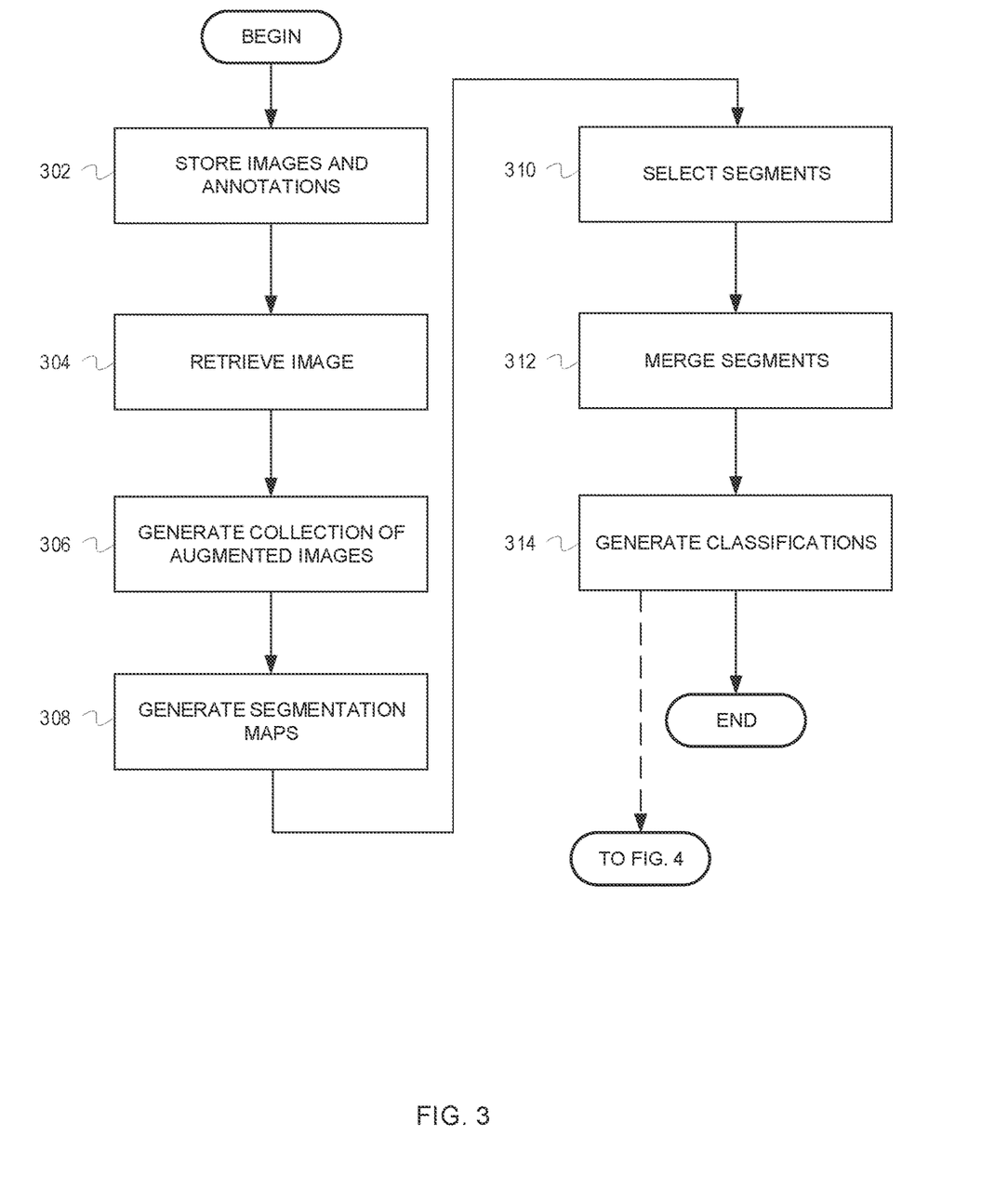
FIG. 3 is a flow chart depicting example operations for automatically annotating images, according to some embodiments.

While the discussion of FIG. 2 provides additional detail regarding a system for automatically annotating images, the discussion of FIG. 3 describes example operations for automatically annotating images.

FIG. 3 is a flow chart depicting example operations for automatically annotating images, according to some embodiments. The flow begins at block 302.

At block 302, images and annotations are stored. For example, a database can store the images and the annotations. The images and/or annotations can be used to train a machine learning model. The annotations include segmented images as well as classifications for the segments of the segmented images. In some embodiments, the images, as well as the annotations, can be used by the machine learning model to identify items in images. The flow continues at block 304.

At block 304, an image is retrieved. For example, a control circuit can retrieve the image from a database. The flow continues at block 306.

At block 306, a collection of augmented images is generated. For example, the control circuit can generate the collection of augmented images based on the retrieved image. The augmented images are used to annotate the image. The augmented images are modified, adjusted, etc. versions of the image to use as additional images and/or comparison images. The control circuit augments the image by, for example adjusting the color of the image (e.g., making the image grayscale, enhancing the colors, inverting the colors, changing the colors, etc.), adjusting noise of the image, adjusting sharpness of the image, rotating the image (e.g., about an axis, mirroring, etc.), cropping the image, resizing the image (e.g., making the image larger or smaller), etc. The control circuit can generate as many, or as few, augmented images for the collection of augmented images as desired. For example, the control circuit can generate five, 10, 20, 50, 100, 1,000, 10,000, etc. augmented images based on the image. The flow continues at block 308.

At block 308, segmentation maps are generated. For example, the control circuit can generate segmentation maps for each of the augmented images. The segmentation maps include segments. The segments are associated with objects in the image. For example, in a retail use case, the segments can be associated with products in the image. The flow continues ag block 310.

At block 310, segments are selected. For example, the control circuit can select segments from the segmentation maps. The control circuit selects the segments based on a threshold. For example, the threshold can be a consistency threshold that compares the segments to segments of other segmentation maps (e.g., the segmentation maps based on the augmented images, a master segmentation map, etc.). The control circuit selects those segments that are above the threshold. The threshold can be preset and/or user adjustable. The flow continues at block 312.

At block 312, the segments are merged. For example, the control circuit can merge the images. That is, the control circuit can merge those images selected based on the threshold to generate segmented image. The segmented image is a composite of the segments selected from the segmentation maps created based on the augmented images. The flow continues at block 314.

At block 314, classifications are generated. For example, the control circuit can generate classifications. The control circuit generates classification for each of the segments. For example, in a retail use case, with the purchased products list from the database, the classifications can indicate what product is associated with the segment, a type of product associated with the segment, a category of product associated with the segment, a color of a product associated with a segment, a product identifier of a product associated with the segment, etc. In some embodiments, the control circuit can generate classifications based on a list of products included in the image. For example, if the model is being trained based on images of customer's carts, the control circuit can compile a list of products in the cart based, for example, on a receipt. In such embodiments, the model can continue training during down time (e.g., when the retail facility is closed, traffic is low, etc.). Once the images are annotated (i.e., the segmented image and classifications are complete), the annotations can be stored in the database. In some embodiments, for example as described with respect to FIG. 4, the annotations and images (i.e., annotated images) can be used to identify products in an image.

Figure 4:
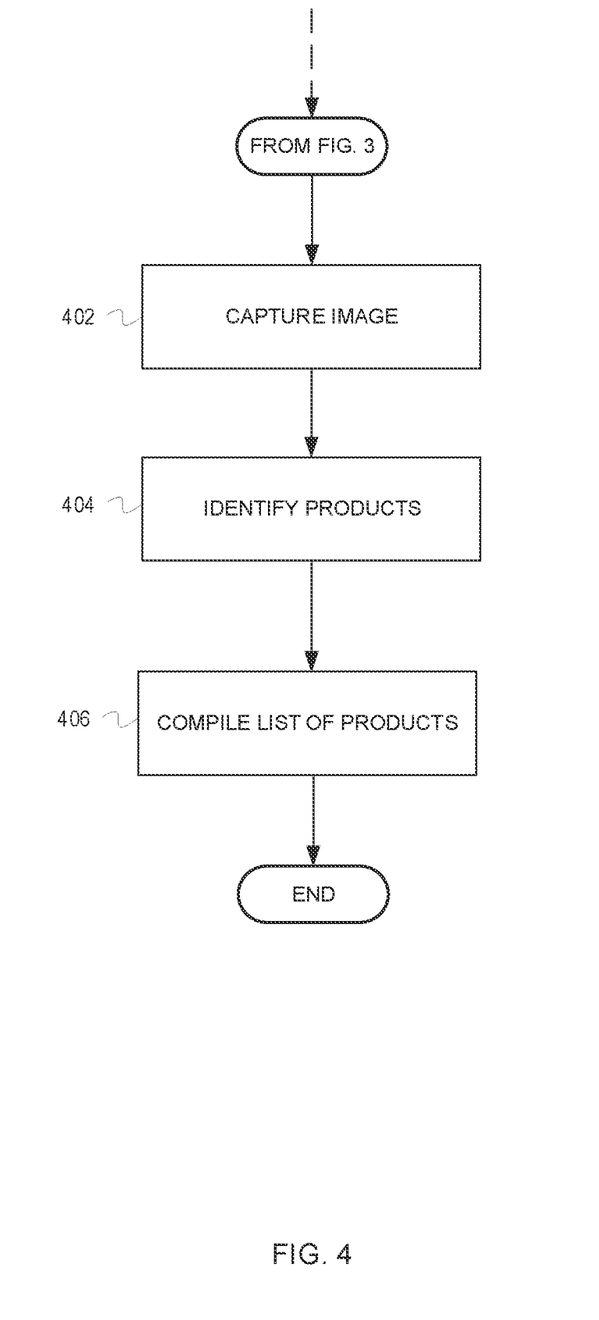
FIG. 4 is a flow chart depicting example operations for identifying products in an image, according to some embodiments.

While the discussion of FIG. 3 describes the automatic annotation of images, the discussion of FIG. 4 provides additional detail regarding identifying product in an image based on the annotated images.

FIG. 4 is a flow chart depicting example operations for identifying products in an image, according to some embodiments. In one embodiment, the operations of FIG. 4 occur after the operations of FIG. 3, as depicted by the dashed arrows in FIGS. 3 and 4. That is, in such embodiments, a model is trained via the operations of FIG. 3 and the operations of FIG. 4 are executed to identify products in the image based on the model. The flow begins at block 402.

At block 402, an image is captured. For example, an image capture device can capture the image. The image includes items for identification. In a retail environment, the image can include products to be identified. The products can be identified for inventory purposes, automated checkout purposes, shrink reduction, confirmation of product placement, etc. As one specific example, the image can be of a customer's cart. Assuming the customer's cart has products in it, the image will have products in it. The flow continues at block 404.

At block 404, products are identified. For example, the control circuit can identify the product. The control circuit can identify the products in the image. The control circuit can identify the products in the image based on computer vision technologies and machine learning. For example, the control circuit can use the annotated images in the database to aid in identifying the products in the image. The flow continues at block 406.

At block 406, a list of products is compiled. For example, the control circuit can compile the list of products. The control circuit can compile the list of products from a transaction history received from a POS terminal. The list of products can be used to 1) aid in quickly identifying the products and/or 2) verify the identity of the products. For example, if it is assumed that the products in the image must also be included in the transaction history, it narrows the possible products that may be included in the image. Additionally, if the system determines that a product is included in the image but not the transaction history, it may be indicative of a shrink event. Additionally, or alternatively, the transaction history can be used to verify the identification of the products. For example, if the control circuit determines that Product A, Product B, and Product C are in the image and the transaction history includes Product A, Product B, and Product C, the transaction history can verify that the products were identified correctly.

In some embodiments, a system for automatically annotating images comprises a database, wherein the database is configured to store images and annotations for the images and a control circuit, wherein the control circuit is communicatively coupled to the database, and wherein the control circuit is configured to retrieve, from the database, an image, generate, based on the image, a collection of augmented images, generate segmentation maps for each image in the collection of augmented images, wherein each of the segmentation maps include segments, select, based on a threshold, ones of the segments above a threshold, merge the ones of the segments above the threshold to create a segmented image, and generate, for each segment of the segmented image, classifications, wherein an annotation for the image includes the segmented images and the classifications.

In some embodiments, an apparatus and a corresponding method performed by the apparatus comprises storing, in a database, images and annotations for the images, retrieving, by a control circuit from the database, an image, generating, by the control circuit based on the image, a collection of augmented images, generating, by the control circuit, segmentation maps for each of the augmented images, wherein each of the segmentation maps includes segments, selecting, by the control circuit based on a threshold, ones of the segments above the threshold, merging, by the control circuit, the ones of the segments above the threshold to create a segmented image, and generating, for each segment of the segmented image, classifications, wherein an annotation for the image includes the segmented image and the classifications.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:
1. A system for automatically annotating images, the system comprising:
   a database, wherein the database is configured to store images and annotations for the images; and
   a control circuit, wherein the control circuit is communicatively coupled to the database, and wherein the control circuit is configured to:
   retrieve, from that database, an image;
   generate, based on the image, a collection of augmented images;
   generate segmentation maps for each image in the collection of augmented images, wherein each of the segmentation maps include segments;
   select, based on a threshold, ones of the segments above a threshold;
   merge the ones of the segments above the threshold to create a segmented image; and
   generate, for each segment of the segmented image, classifications, wherein an annotation for the image includes the segmented images and the classifications.

2. The system of claim 1, further comprising:
an image capture device, wherein the image capture device is configured to capture images of carts.

3. The system of claim 2, wherein the control circuit is further configured to:
identify, based on a machine learning model, the images, and the annotations for the images, products located in the carts.

4. The system of claim 3, wherein the control circuit is further configured to:
compile, based on transaction histories associated with the carts, a list of products purchased with each cart, wherein the identification of the products located in the carts is further based on the list of products purchased with each cart.

5. The system of claim 2, wherein the control circuit is further configured to:
segment the images of carts.

6. The system of claim 1, wherein the control circuit generates the augmented images by one or more of adjusting color of the image, adjusting noise of the image, adjusting sharpness of the image, rotating the image, and cropping the image.

7. The system of claim 1, wherein the control circuit generates the augmented images randomly.

8. The system of claim 1, wherein the control circuit generates at least twenty augmented images based on the image.

9. The system of claim 1, wherein the threshold is a consistency threshold representing a consistency of the segments between the segmentation maps.

10. The system of claim 9, wherein the consistency threshold is at least 70%.

11. A method for automatically annotating images, the method comprising:
storing, in a database, images and annotations for the images;
retrieving, by a control circuit from the database, an image;
generating, by the control circuit based on the image, a collection of augmented images;
generating, by the control circuit, segmentation maps for each of the augmented images, wherein each of the segmentation maps includes segments;
selecting, by the control circuit based on a threshold, ones of the segments above the threshold;
merging, by the control circuit, the ones of the segments above the threshold to create a segmented image; and
generating, for each segment of the segmented image, classifications, wherein an annotation for the image includes the segmented image and the classifications.

12. The method of claim 11, further comprising:
capturing, by an image capture device, images of carts.

13. The method of claim 12, further comprising:
identifying, by the control circuit based on a machine learning model, the images, and the annotations for the images, products located in the carts.

14. The method of claim 13, further comprising:
compiling, by the control circuit based on transaction histories associated with the carts, a list of products purchased with each cart, wherein the identifying the products located in the carts is further based on the list of products purchased with each cart.

15. The method of claim 12, further comprising:
segmenting, by the control circuit, the images of the carts.

16. The method of claim 11, wherein the control circuit generates the augmented images by one or more of adjusting color of the image, adjusting noise of the image, adjusting sharpness of the image, rotating the image, and cropping the image.

17. The method of claim 11, wherein the control circuit generates the augments images randomly.

18. The method of claim 11, wherein the control circuit generates at least twenty augmented images.

19. The method of claim 11, wherein the threshold is a consistency threshold representing a consistency of the segments between the segmentation maps.

20. The method of claim 19, wherein the consistency threshold is at least 70%.

* * * * *